Aug. 26, 1952     R. J. D. STOKES ET AL     2,608,083
WASHING MACHINE HAVING MEANS FOR ATTACHING
SAME TO A VEHICLE WHEEL
Filed July 26, 1949     2 SHEETS—SHEET 1

INVENTORS,
RICHARD J. D. STOKES
ALFRED P. D. STOKES, JR.

BY Mason & Mason
ATTORNEYS.

Aug. 26, 1952     R. J. D. STOKES ET AL     2,608,083
WASHING MACHINE HAVING MEANS FOR ATTACHING
SAME TO A VEHICLE WHEEL
Filed July 26, 1949                            2 SHEETS—SHEET 2

INVENTORS.
RICHARD J. D. STOKES
ALFRED P. D. STOKES, JR.

BY Mason & Mason
ATTORNEYS

Patented Aug. 26, 1952

2,608,083

UNITED STATES PATENT OFFICE 2,608,083

WASHING MACHINE HAVING MEANS FOR ATTACHING SAME TO A VEHICLE WHEEL

Richard J. D. Stokes, Riverside, and Alfred P. D. Stokes, Jr., San Diego, Calif.

Application July 26, 1949, Serial No. 106,908

3 Claims. (Cl. 68—24)

This invention relates to a washing machine provided with means for attaching the same to a vehicle wheel, and whereby clothes may be washed by power furnished from the vehicle, it being only necessary to jack up a wheel of the vehicle and attach the washing machine to one of the drive wheels.

An object of the invention, therefore, is to provide a washing machine which may be attached to one of the drive wheels of an automotive vehicle.

Another object of the invention is to provide a washing machine comprising a minimum of parts with means for readily mounting the same on one of the drive wheels of a motor car or truck.

An additional object of the invention is to provide a portable, light weight and collapsible washing machine intended for campers, those who live in trailers, and other travelers, with means for attaching the same to one of the drive wheels of any type of motor vehicle.

Yet another object of the invention is to provide a portable washing machine provided with means for centrifugally drying the clothes in the machine following the washing operation.

Another object of the invention is to provide a washing machine composed principally of complementary shells which may be nested, one within the other, in order to occupy a minimum of space in carrying the same from place to place.

Other objects will appear throughout the specification.

The washing machine of the present invention is of especial value to campers and those who live in trailers, as it provides a ready means for quickly washing and drying clothes. The washing machine utilizes the power of any automobile engine and it is so constructed that it may be readily attached to any of the automobiles and most of the trucks on the market today. Ease of assembly and economical construction are among the outstanding features of this invention.

Figure 1:
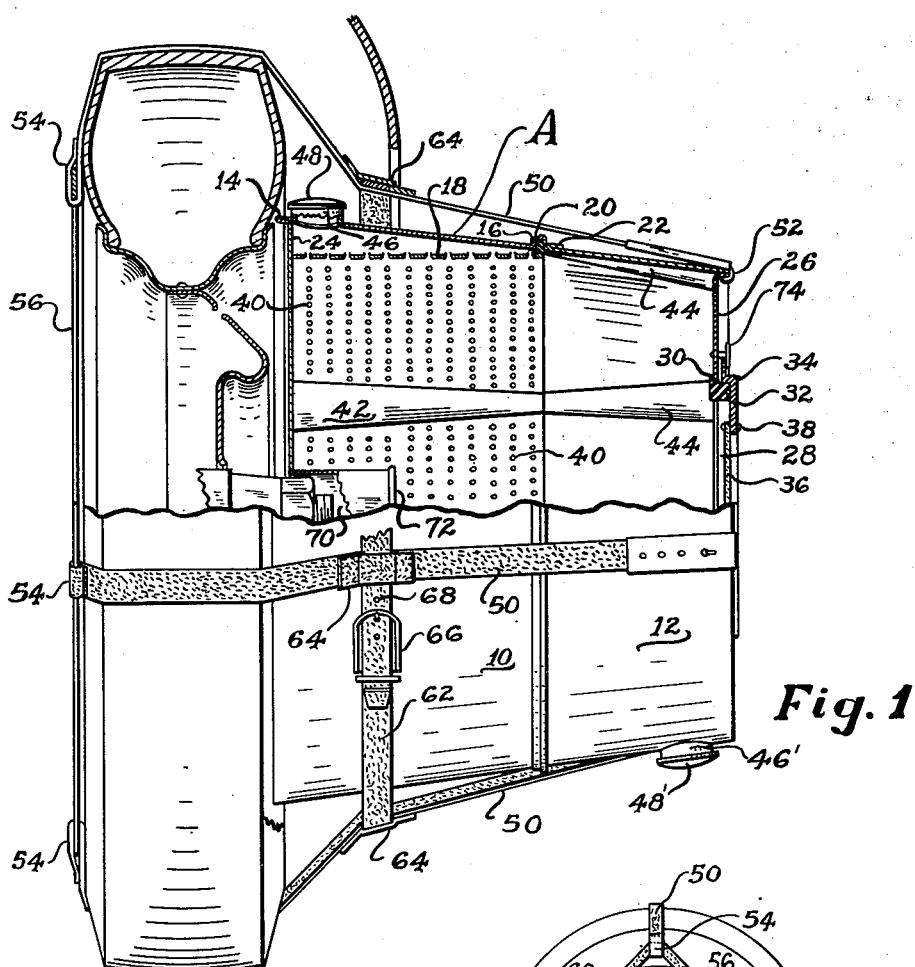
Figure 1 is a front elevation of the wheel of an automobile with the washing machine attached thereto showing parts of the wheel and washing machine broken away and in section.
Figure 4:
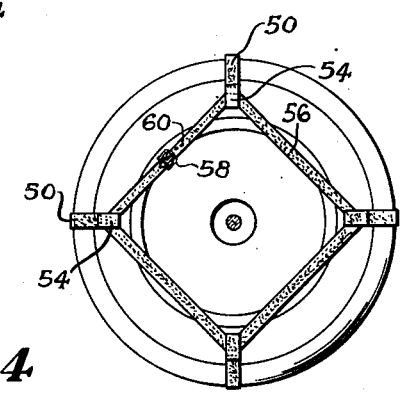
Figure 4 is a side elevation of a vehicle wheel on a smaller scale, with the washing machine attached thereto but taken from the opposite direction than the one shown in Figure 2.
Figure 3:
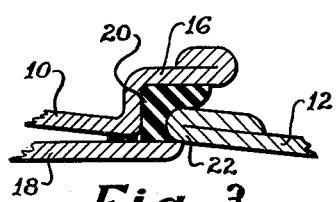
Figure 3 is a broken away sectional view showing the connection between the washing machine shells.

In the drawings, the letter A designates generally the washing machine. The washing machine consists of a pair of shells 10 and 12. These shells may be joined together to form a waterproof washer by means of the joint shown in Figures 1 and 3. The shell 10 is provided with a flange 14. This flange fits over the rims of standard motor vehicle wheels which carry 15 or 16 inch tires. Where 17 inch tires or larger tires are used, the flange will fit within the flared portion of the tire rim. The opposite rim of the shell 10 is provided with an offset flange 16 and an inner cylinder 18 in order to provide a circular recess for the reception of a ring 20 preferably composed of soft rubber or rubber-like material. The two shells, when fitted together as shown in Figure 1, provide a truncated cone. Shell 12 has a flange 22 which is adapted to fit over the skirt 18 and engage the rubber ring 20. The larger end of the shell 10 is closed by a partition 24, which partition is inset from the flange 14. The smaller end of the shell 12 is provided with a head or end wall 26 having a central opening for a rubber gasket 30, which may be attached thereto by any suitable means. Mounted upon the interior surface of shell 12 and extending transversely across the same are a plurality of spaced vanes or agitators 44.

The removable cap 32 is provided with a stepped flange 34 which seats against the gasket 30 when the cap is in closed position. There is a viewing window 36 of glass or other transparent material in the cap.

The window is retained in the cap by a gasket (not shown) and a series of screws 38 arranged circumferentially of the cap.

Figure 5:
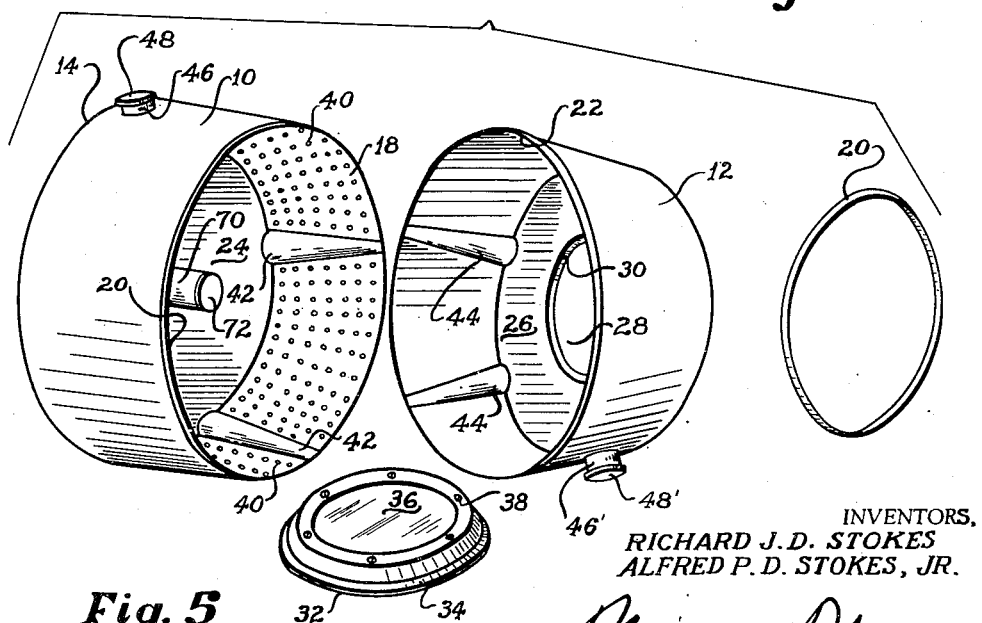
Figure 5 is a view in perspective of the washing machine shells and the closure cap therefor.

The inner cylinder 18 is preferably of general cylindrical shape. It is rigidly attached, such as by welding, to the partition 24. This inner cylinder is provided with a plurality of spaced rows of apertures 40 as seen in Figures 1 and 5.

Mounted upon the interior surface of the cylinder 18 and extending transversely across the same are a plurality of spaced vanes or agitators 42.

Shell 10 is provided with an opening 46 and a cap 48 to provide for filling or partially filling the machine with a washing liquid such as water. Soap flakes may also be introduced through this opening. Similarly, mounted in shell 12, is an opening 46' closed by a cap 48' which is used for draining purposes.

Figure 2:
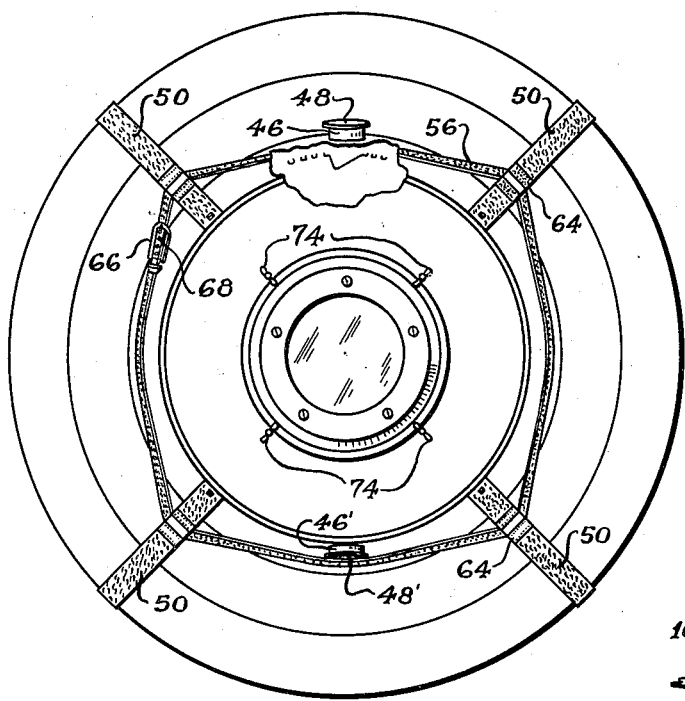
Figure 2 is a side elevation of the washing machine shown in Figure 1.

The assembled shells are retained in proper position on a drive wheel of an automobile by a series of straps 50, the right end of each, as viewed in Figure 1, being provided with a hook 52. Also as shown in this figure, the left end of each strap is provided with a loop 54 through which is threaded the strap 56, the latter being provided with a buckle and a series of holes numbered 58 and 60 respectively, as seen in Figure 2.

The straps are also held taut by means of the circular strap 62 which passes through loops 64 in the strap 50. Circular strap 62 may be tightened by means of buckle 66 which engages a series of holes 68 in the other end of the strap.

Referring again to Figures 1 and 5, there is a cylindrical protuberance in shell 10, indicated by the numeral 70, having a cap 72 whereby to accommodate the end of the usual wheel axle and to provide a water-tight fixture at the large end of the shell 10.

Assuming that it is desired to wash clothes in the washer, one of the drive wheels of the car is jacked up so that the wheel is free of the ground. The two shells of the washer are next assembled so that they form a truncated cone, and the assembly is placed against the vehicle wheel, and the straps are applied. The assembly is held in the position shown in Figures 1 and 2 by the harness that includes the four straps 50. The hooks 52 of these straps are first hooked over the outer flange of the shell 12, and after the strap 56 has been placed in the position shown in Figure 1, the strap 62 is inserted through the opening and tightened by means of the buckle 66 and holes 68.

If the clothes have not already been placed in the receptacle, they are now placed in the machine through the opening 28 which is now closed by the cap 32 and held in position by the clamps 74. Before the cap 48 is inserted in place, the washing powder or soap may be poured through the opening 46.

The entire assemblage now being water-tight, water is introduced through the opening 46 and the cap 48 is then placed on this opening, it being assumed that cap 48' is in position over the opening 46' of shell 12.

The motor is now started and the wheel is rotated at a speed which should not exceed approximately 25 miles per hour.

Following the washing operation, the rotation of the wheel is stopped with the opening 46' at its lowermost position as shown in Figure 1. Cap 48' is then removed and the water is drained out of the washer.

When drying the clothes following the washing operation, the cover 48 is removed. The wheel is rotated at high speed and, of course, the washer rotates at this speed. Centrifugal force causes the water to be forced from the clothes, through the perforated cylinder 18 and into the space formed by the cylinder and the truncated cone 10. Due to the shell's taper, there is a component of the centrifugal force which causes the water to slide along the shell surface to seek the largest diameter of the shell, the water finding its way out through the opening 46 under centrifugal action. It will be noted that the opening 46 rotates within the fender area of the car and the water is thus confined to this area.

After drainage of the water, the clothes may be rinsed by introducing fresh water through the opening 46, the caps 48 having been replaced before the rinsing operation begins. Following the rinsing operation the water is drained through the opening 46' with the car wheel stationary. Following this operation, the wheel is rotated at a speed of at least 25 miles per hour.

All idling should be done in second gear and the idling speed includes the washing and rinsing operations.

It is to be understood that the drawing and description are to be considered as illustrative of one form of the invention and that the invention may take other forms, as we do not desire to be limited in the practice of this invention except as indicated by the appended claims.

We claim:

1. In a combined washing and drying machine, the combination of a plurality of shells, means for attaching said shells to each other including a circular recess in one of said shells, a compressible ring of rubber-like material in said recess, a flange on another of said shells adapted to fit into said circular recess and against said ring, one of said shells being of larger size than another of said shells, said shells when fitted together forming a section of a truncated cone, one of said shells having within and spaced therefrom a perforated cylinder, means for detachably attaching said assembled shells to the side face of a drive wheel of an automotive vehicle, one of said shells having an end wall provided with a central recess adapted for the reception of a drive axle of said drive wheel and the other of said shells having an end wall provided with an aperture, a removable cap for said aperture, and means for retaining said cap on said aperture in fluid-tight relationship.

2. In a combined washing and drying machine, the combination of a plurality of shells, means for attaching said shells to each other including a circular recess in one of said shells, a flange on another of said shells adapted to fit into said circular recess, one of said shells having within and spaced therefrom a perforated cylinder, means for detachably attaching said assembled shells to the side face of a drive wheel of an automotive vehicle, one of said shells having an end wall provided with a central recess adapted for the reception of a drive axle of said drive wheel and the other of said shells having an end wall provided with an aperture, a removable cap for said aperture, and means for retaining said cap on said aperture in fluid-tight relationship.

3. In a combined washing and drying machine, the combination of a pair of shells of circular cross section, means for attaching said shells to each other including a circular recess in one of said shells, a flange on another of said shells adapted to fit into said circular recess, said one shell having within and spaced therefrom a perforated cylinder having an interior surface, means for detachably attaching said assembled shells to the side face of a drive wheel of an automotive vehicle, said one shell having an end wall provided with a central recess adapted for the reception of a drive axle of said drive wheel and the other of said shells having an end wall provided with an aperture, a removable cap for said aperture, said interior surface of said perforated cylinder and the inside surface of said other shell having a plurality of spaced agitators mounted thereon.

RICHARD J. D. STOKES.
ALFRED P. D. STOKES, Jr.

REFERENCES CITED

The following references are of record in the file of this patent:

UNITED STATES PATENTS

| Number | Name | Date |
|---|---|---|
| 513,600 | Tanzer | Jan. 30, 1894 |
| 1,349,428 | Marshall, Jr. | Aug. 10, 1920 |
| 1,587,778 | Kadesch | June 8, 1926 |
| 2,173,603 | Dodge | Sept. 19, 1939 |
| 2,272,284 | Zimarek | Feb. 10, 1942 |
| 2,330,421 | Haberstump | Sept. 28, 1943 |
| 2,356,818 | Bruckman | Aug. 29, 1944 |
| 2,483,676 | Slutsky | Oct. 4, 1949 |